(12) United States Patent
Citron et al.

(10) Patent No.: US 9,721,479 B2
(45) Date of Patent: Aug. 1, 2017

(54) APPARATUS, SYSTEM AND METHOD FOR TEACHING MUSIC AND OTHER ART FORMS

(71) Applicants: Howard Citron, South Salem, NY (US); Chuck Leavell, Dry Branch, GA (US)

(72) Inventors: Howard Citron, South Salem, NY (US); Chuck Leavell, Dry Branch, GA (US)

( * ) Notice: Subject to any disclaimer, the term of this patent is extended or adjusted under 35 U.S.C. 154(b) by 757 days.

(21) Appl. No.: 13/905,464

(22) Filed: May 30, 2013

(65) Prior Publication Data

US 2014/0352520 A1 Dec. 4, 2014

(51) Int. Cl.
*G09B 15/00* (2006.01)
(52) U.S. Cl.
CPC .................................. *G09B 15/00* (2013.01)
(58) Field of Classification Search
CPC ...... G09B 15/00; G09B 15/02; G09B 15/003; G09B 19/00; G09B 15/001; G09B 17/00; G09B 5/02; G09B 11/00; G09B 11/04; G09B 15/008; G10H 2220/015; G10H 1/0016; G10H 1/38; G10H 1/383; G10H 1/40
USPC ....................................................... 84/470 R
See application file for complete search history.

(56) References Cited

U.S. PATENT DOCUMENTS

| | | | | |
|---|---|---|---|---|
| 5,533,903 | A * | 7/1996 | Kennedy | G09B 5/065 345/473 |
| 6,211,451 | B1 * | 4/2001 | Tohgi | G09B 5/065 434/323 |
| 2005/0016359 | A1 * | 1/2005 | Berens | G09B 15/004 84/470 R |

* cited by examiner

*Primary Examiner* — Kimberly Lockett
(74) *Attorney, Agent, or Firm* — Schmeiser, Olsen & Watts LLP; Anthony L. Meola

(57) ABSTRACT

An apparatus, system and method are disclosed for teaching musical instruction. The invention disclosed includes providing music instruction based upon a student's ability and preferred most dynamic efficient method of learning.

14 Claims, 11 Drawing Sheets

Examples of Song Lesson

Line from Level 1 Song Lesson

Line from Level 2 Song Lesson

Line from Level 3 Song Lesson

Line from Level 4 Song Lesson

Examples of Song Lesson (continued)

Line from Level 5 Song Lesson

Line from Level 6 Song Lesson

Line from Level 7 Song Lesson

FIG. 6A

Examples of Exercise (continued)

Line from Level 5 Exercise

Line from Level 6 Exercise

Line from Level 7 Exercise

Examples of Improvisation ( continued)

Line fom Level 5 Improvisation

Line from Level 6 Improvisation

Line from Level 7 Improvisation

FIG. 7B

Examples of Groove Charts

Line from Level 4 Groove Chart

Line from Level 6 Groove Chart

APPARATUS, SYSTEM AND METHOD FOR TEACHING MUSIC AND OTHER ART FORMS

CROSS-REFERENCE TO RELATED APPLICATIONS

This application relates to and takes priority from co-pending U.S. Provisional Patent Application 61/653,496, entitled, "METHOD FOR TEACHING MUSIC AND OTHER ART FORMS", filed May 31, 2012; all of which co-pending application is hereby incorporated by reference in its entirety.

BACKGROUND OF THE INVENTION

Field of the Invention

The present invention relates generally to the field of music instruction and more specifically to an apparatus, system and method for teaching music and other art form instruction.

Background of the Art

The invention includes a new, multidimensional, holistic approach to music and other art form instruction to serve as an improved contemporary alternative, or supplement, to the more traditional teaching methods such as the Suzuki® Method or the educational music series such as Hanon or Schaum, each which have inherent drawbacks and limitations.

The traditional teaching systems each have their unique strengths, but unfortunately, they also have many inadequacies. While most teaching methods incorporate a progressive approach to learning by differentiating between levels, such as beginner, intermediate, and advanced, the student is not afforded the ability to learn elements that come natural to them and to advance these particular elements without first mastering all the other elements offered at that level. Most teaching methods incorporate basic musical elements such as melody, rhythm, harmonics and pitch; however, they do not necessarily incorporate all these elements holistically in every lesson. They are instead offered in disparate pieces. While a few teaching methods might provide the student with beginning levels of a particular song and then provide progressively more complex versions of the same song for the student to build upon, none provide enough discrete levels for a particular song to enable a student to progress smoothly from a beginner to an advanced player. Most music methods are focused on a unidimensional teaching approach such as teaching music through body rhythm, written notation, rote memorization, or listening. None take into consideration that each student has their own approach to learning by offering multiple paths towards learning. And finally, none of the historical or currently popular methods were designed to exploit current technologies such as video streaming over the internet, tablet computing, and social networks. Therefore, there is a need for a an instructional method that provides students with multiple paths of progressive learning that addresses both the individual's abilities and interests while utilizing current technologies such as the internet, mobile computing, and social networks.

SUMMARY OF THE INVENTION

The present invention includes an apparatus, system and method for teaching music instruction dependent upon the ability level of the student and his/her preferred method of learning.

In first embodiment, the present invention includes a method for teaching music instruction, including determining an ability level of a student, selecting an instructional level based upon the determined ability level of the student, selecting music based on the determined ability level of the student and the selected instructional level, identifying a first set of pre-determined musical elements based on the determined ability level of the student and the selected instructional level, selecting at least one element from the first set of pre-determined musical elements based on the determined ability level of the student and the selected instructional level; and providing at least one set of levels for the selected music to allow the student to progress from at least a first level to at least one advanced level.

In some embodiments there includes the step of determining an updated student ability level after the step of selecting at least one element from the first set of pre-determined musical elements, the step of providing print information, the step of providing video instruction access, the step of providing in-person instruction and the step of selecting new music for the student after the step of determining an updated student ability.

In other embodiments there includes the step of increasing the instructional level for the student after the step of determining an updated student ability. In some embodiments the step of selecting music further includes the step of selecting music based upon a student's pre-determined choices. In some embodiments the step of providing at least one set of levels for the selected music in order to allow the student to learn the musical selection regardless of the student's determined ability the first set of pre-determined musical further elements comprises the step of selecting scales and chords.

In some embodiments the first set of pre-determined musical elements includes the step of determining a groove chart upon the ability level of the student and the selected instructional level and includes the step of determining an exercise for the selected music based upon the ability level of the student and the selected instructional level.

In some embodiments the first set of pre-determined musical elements includes the step of determining a lesson scheme for the selected music based upon the ability level of the student and the selected instructional level.

In some embodiments the first set of pre-determined musical elements includes the step of determining an improvisation for the selected music based upon the ability level of the student and the selected instructional level.

In a second aspect the present invention includes an apparatus having an interconnected database, GUI, and hard drive, the hard drive including a computer readable storage medium on which is embedded one or more computer programs, the one or more computer programs for implementing a method of teaching musical instruction, the one or more computer programs including a set of instructions for determining an ability of level of a student, selecting an instructional level based upon the determined ability level of the student, selecting music based on the determined ability level of the student and the selected instructional level and selecting pre-determined elements of the selected music to be taught to the student including, selecting scales and chords related to the pre-determined elements, determining a groove chart for the selected pre-determined elements based upon the ability level of the student and the selected instructional level, determining a lesson scheme for the selected music based upon the ability level of the student and the selected instructional level, determining an improvisation for the selected music based upon the ability level of the student and the selected instructional level and determining an exercise for the selected music based upon the ability level of the student and the selected instructional level.

In a third aspect the present invention includes a method for teaching, the method including the steps of determining an ability of level of a student for a pre-determined skill, selecting an instructional level based upon the determined ability level of the student, selecting an educational representation of the pre-determined skill based on the determined ability level of the student, pre-selected choices of the student and the selected instructional level, identifying a first set of pre-determined elements of the selected educational representation of the pre-determined skill to be taught to the student, selecting at least one element from the first set of pre-determined elements of the educational representation of the pre-determined skill, identifying at least one pattern of the educational representation for the selected at least one pre-determined element based upon the ability level of the student and the selected instructional level, determining a lesson scheme for the at least one pre-determined element based upon the ability level of the student and the selected instructional level, determining a creative expression for the selected educational representation of the pre-determined skill based upon the ability level of the student and the selected instructional level determining an exercise for the selected educational representation of the pre-determined skill based upon the ability level of the student and the selected instructional level, and providing at least one level for each educational representation of the pre-determined skill selection to allow the student to progress from a beginner level to an advanced level.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIGS. 6A-6B show musical lines from exemplary Exercises for the piano from a popular rock song "You Can't Always Get What You Want" written by Keith Richards and Mick Jagger of the rock band 'The Rolling Stones';

FIGS. 7A-7B show musical lines from exemplary Improvisations for the piano from a popular rock song "You Can't Always Get What You Want" written by Keith Richards and Mick Jagger of the rock band 'The Rolling Stones'.

DETAILED DESCRIPTION OF THE PREFERRED EMBODIMENTS

The present disclosure will now be described more fully with reference to the Figures in which an embodiment of the present disclosure is shown. The subject matter of this disclosure may, however, be embodied in many different forms and should not be construed as being limited to the embodiments set forth herein.

Exemplary Operating Environment

Figure 1:
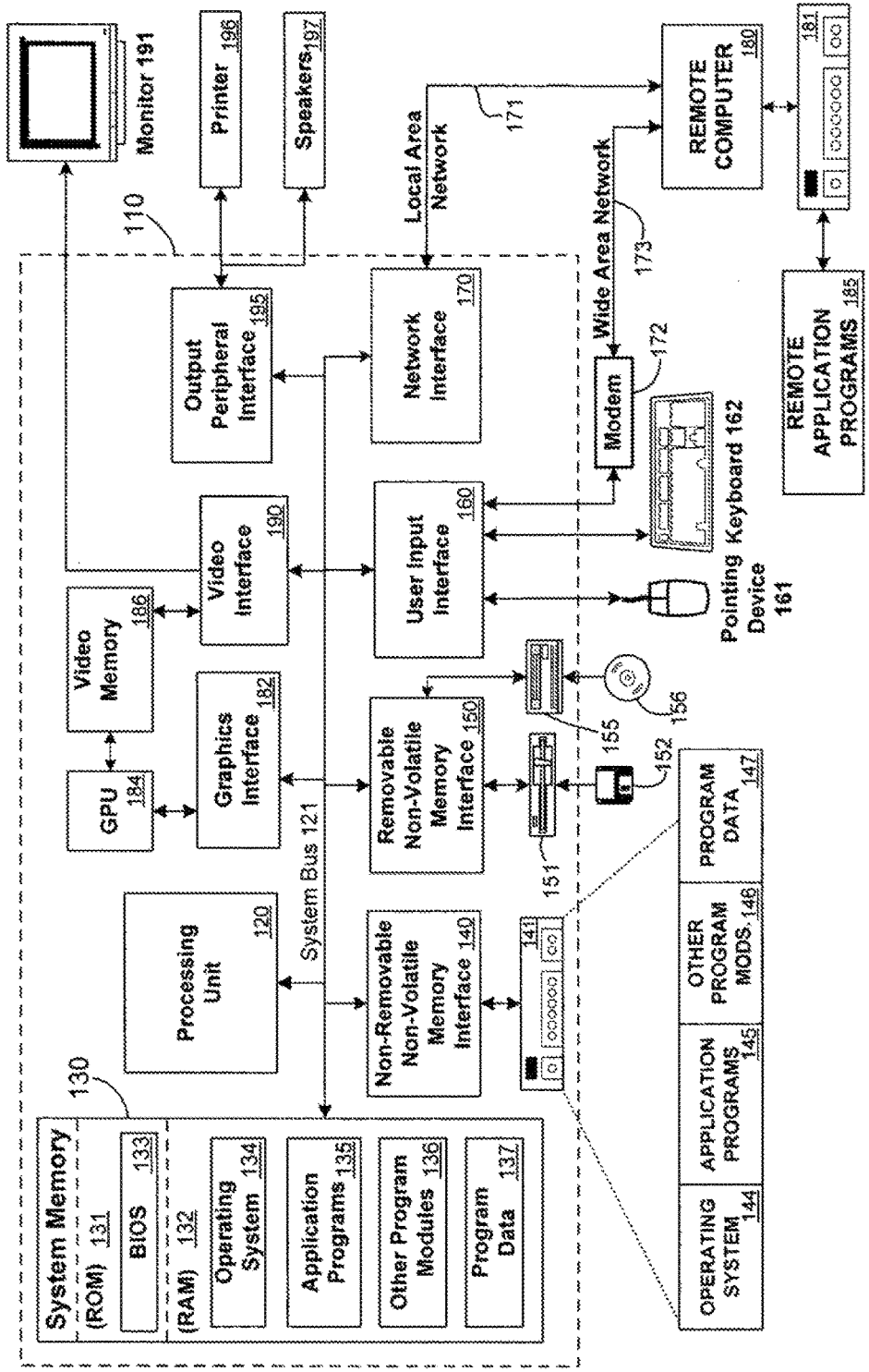
FIG. 1 is a block diagram showing an exemplary computing environment in which aspects of the present invention may be implemented.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, and scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The invention is can be implemented via a mobile device. However any mobile electronic device having a GUI, a database, or access thereto, and a network connection, or access thereto, can be used to implement the present invention Described herein is an example of the inventive apparatus system and method as applied to musical instruction. The present invention has four underlying philosophies at the core of its approach. First, that every student has his/her own unique approach to learning and an instructional method should support multiple learning modes and multiple delivery mechanisms. Second, that while some students are interested in seeking a progressive path of mastering a particular set of skills before advancing to the next level, other students prefer to focus their energies on learning songs regardless of their level of proficiency. Third, students are more enthusiastic and better learners if they are playing music that is familiar to them. Lastly, music is most fun and appreciated when played with others.

The present invention addresses the different learning modes of students. After years of observing students, working with music teachers, and performing with some of the most successful musicians in contemporary music, the inventors determined that an improved music education method should address different approaches to learning. It should support students with a bias towards creative thinking (often referred to as right-brain dominance) by permitting the student the freedom and flexibility to explore music through creativity and experimentation and also support logical thinkers (often referred to as left-brain dominance) who might prefer to learn through rhythmic and theory exercises. The inventors also observed that the concentration levels of students varied widely by age and also by personality so the delivery mechanism must support students with a wide range of attention spans. While many students prefer learning through written musical notation, a significant number of accomplished contemporary musicians do not know how to read musical notation and the method must also support these 'non-readers'. These musicians prefer to learn by listening, watching, and copying. Finally, some students prefer to master a song so they can perform for others while others prefer to master a set of skills that they can apply to any song. The present invention addresses all of these learning modes and student preferences.

In order to effectively address this multifaceted, multidimensional approach to learning, a number of different learning elements should be included in an instruction package presented to the student. In one embodiment of the present invention, five elements are included to address the varying learning modes of students:

Groove Charts
Song Lessons
Exercises
Improvisation
Scales, Chords, Arpeggios

These elements make up five different components of each lesson package; the groove charts, the song lesson, the exercise, the improvisation, and the scales, chords, and arpeggios. Each element is introduced to address one or more modes of learning as described in herein. It is understood that the five elements example provided above is exemplary only and the invention may include any number of elements.

Beginning students typically gravitate towards one or two elements that are most conducive to their preferred learning mode. The present invention does not require a beginning student to master each element of the invention. The objective is to provide a path that captures the student's interest, attention, and desire so they continue the learning process voluntarily. As students advance, they tend to add more of the lesson elements to their learning process until they eventually master all elements at the more advanced levels.

Groove Charts. Groove Charts allow students to learn the essence of the song without getting bogged down reading notes. Groove Charts may include the chords and/or the underlying rhythm of the song. Groove charts are a musical representation that includes the chord structures and chord progression of a song along with the song's rhythmic patterns. This captures the essence of the song. The groove chart may not include the individual notes that make up the song's melody. Groove Charts are useful for students who do not want to learn to read musical notation. The student only has to learn the chords that make up the song and the rhythmic pattern used to accompany the melody. They are also useful to students who want to play with others in a band or group setting because Groove Charts provide the chords and rhythms for accompanying other musicians.

Song Lessons. Song Lessons are arrangements of the original song for students to perform as a solo piece. The beginning levels are simplified versions of the original recordings and the advanced levels of the songs are comparable in difficulty to the original recordings. Song Lessons are useful to students who want to perform while they also provide the platform for understanding the underlying theory and structure of the song.

Exercises. Exercises are drills to learn dexterity, rhythm, and technique. Exercises are musical components and expressions derived from the original song. They are techniques that are common to contemporary music and can apply to many musical settings. Exercises may be offered in multiple keys to allow the student to explore transposing and musical patterns.

Improvisation. Improvisations are drills to learn how to improvise within the context of a specific song. They are derived from the original song and are based on the chord structure, rhythms, and musical scales that make up the song along with chord substitutions, alternative rhythmic and harmonic patterns and alternative scale selections. The student can expand upon them by an understanding of the scales, chords, rhythms, and progressions that are used in the original recordings. Improvisations are useful to students who do not want to read the musical notation note-for-note, but instead choose to introduce their own interpretation of the song and who prefer learning through listening and free expression.

Scales, Chords, Arpeggios. While scales, chords and arpeggios are necessary elements of a music education, most students find them boring. The present invention introduces the scales, chords and arpeggios in the context of songs to make them more interesting. In an exemplary embodiment, if a song is in the key of C major, the student is introduced to the C major scale and any other scales that might be used in the song, such as the C blues scale or the C mixolydian scale. In the same manner, only the related chords and arpeggios are taught. The scales, chords, and arpeggios may be included as supplemental material for standalone practice but they are also introduced to the students throughout the lessons to connect musical theory to the particular element of instruction.

Delivery Mechanisms. Content can be delivered via the above-referenced computing environment described FIG. 1 including the internet, mobile network or any other viable means for widespread access to computers, tablets, mobile devices or any other viable medium. Elements of the present invention may include providing video and/or printed notation. Video can be delivered in any viable format such as streaming, digital video discs (DVDs) or downloading. Printed notation can be delivered in any viable format such as physical books, electronic books, embedded in digital video discs (DVDs), or downloading.

Students can upload their own videos to receive feedback from instructors, as well as other students. This enables students to receive timely feedback from instructors and students anywhere in the world.

Teachers can provide live or recorded instruction, streamed or downloaded over the internet, mobile network, or any other viable means.

Levels. To accommodate students of varying levels, multiple levels of Instruction Packages are provided for each particular song taught. In one embodiment, seven levels of Instruction Packages for each song are provided. The levels range from complete beginner (Level 1) to an accomplished student (Level 7) capable of performing in a rock band or continuing on to a college education in music. Level 7 lessons are very close to how the original song was recorded. A summary of the seven levels follows:

A level 1 student has no prior music education;

A level 2 student has the skills to play very simple melodies;

A level 3 student has the basic tools to play with others with a basic understanding of chords;

A level 4 student can play at an intermediate level, understands chord structures, and can play syncopated rhythms;

A level 5 student is very capable of playing with a rock band, has solid improvisational skills, and can play complex rhythms;

A level 6 student is an advanced student capable of playing most rock pieces and in most band settings; and Level 7 has the skills to apply to college as a music major.

The levels are designed to develop certain skills that will prepare a student to move smoothly from one level to the next. All lessons at a particular level are comparable. For example, at level 5, eighth note syncopations are introduced in either hand, but rarely in the same bar. Simultaneous eighth note syncopations in both hands are introduced later, at level 6. A similar approach has been applied for all skills and knowledge that is required to master the instrument. It is understood that the seven level example provided above is exemplary only and the invention may include any number of levels for a particular song.

Table 1 provides details to how skills and knowledge are introduced as the student progresses from one level to the next. Skills and knowledge that are introduced may include, but are not limited to; musical keys, accidentals, time signatures, scales, rhythms, rests, hand positions, sound dynamics, composition length, articulation, chord structures, intervals, groove, note durations, and syncopation. Each and every one of these skills and knowledge is introduced progressively as the levels increase. For example, at level 1 half note syncopation is introduced, at level 2 quarter note syncopation is introduced, at level 3 eighth note syncopation is introduced in one hand only and only once per measure, at level 4 eighth note syncopation is introduced to both hands but not in the same measure and sixteenth note syncopation is introduced in one hand only, at level 5 eighth note syncopations are introduced in either hand and occasionally in the same measure, at level 6, simultaneous eighth note syncopations in both hands are introduced and sixteenth note syncopation is introduced in either hand but not in the same measure, and at level 7 both eighth and sixteenth note syncopations are introduced to both hands in the same measure. A similar approach has been applied for all skills and knowledge that is required to master the instrument.

Many students stay on the same level until they have mastered some or all of the elements which may include the Song Lessons, Groove Charts, Exercises, Improvs and/or Scales, Chords, Arpeggios for that level. This is referred to as "horizontal learning." Some students, though, prefer to master one particular song so they might begin at a level 1, for instance, and gradually work their way up to level 7. This alternative is referred to as "vertical learning." Some students might choose to learn only one particular element of the song, such as the lesson or the improvisation, and as they progress they might add additional elements such as the exercises or the groove charts. The inventive method's unique multidimensional, holistic learning approach is designed to accommodate either of the paths a student chooses.

Content. The present invention teaches the fundamentals of music through a set of songs and analogously teaches the fundamentals of other art forms through components of that art. The music lesson instructional content is composed of many songs. One such embodiment may be a series of popular or rock songs. Mastery of these songs provides the musical breadth and depth for the student to learn any musical piece. In a similar fashion, a martial artist, painter or sculptor can learn the complete art by mastering a number of forms related to that skill.

In the five element and seven level exemplary embodiment of the inventive method described herein, an average student should be able to master the entire lesson content in 7 to 10 years, depending on their prior training, aptitude and how often they practice.

Playing with others. While the inventive method is structured as a teaching method for individual students, the content is also designed so the student can also enjoy playing with others. In particular, the "Groove Charts," "Exercises," and "Improvisations" provide the tools for a student to play in a band setting. These are essential elements to an effective contemporary musical education.

Figure 2:
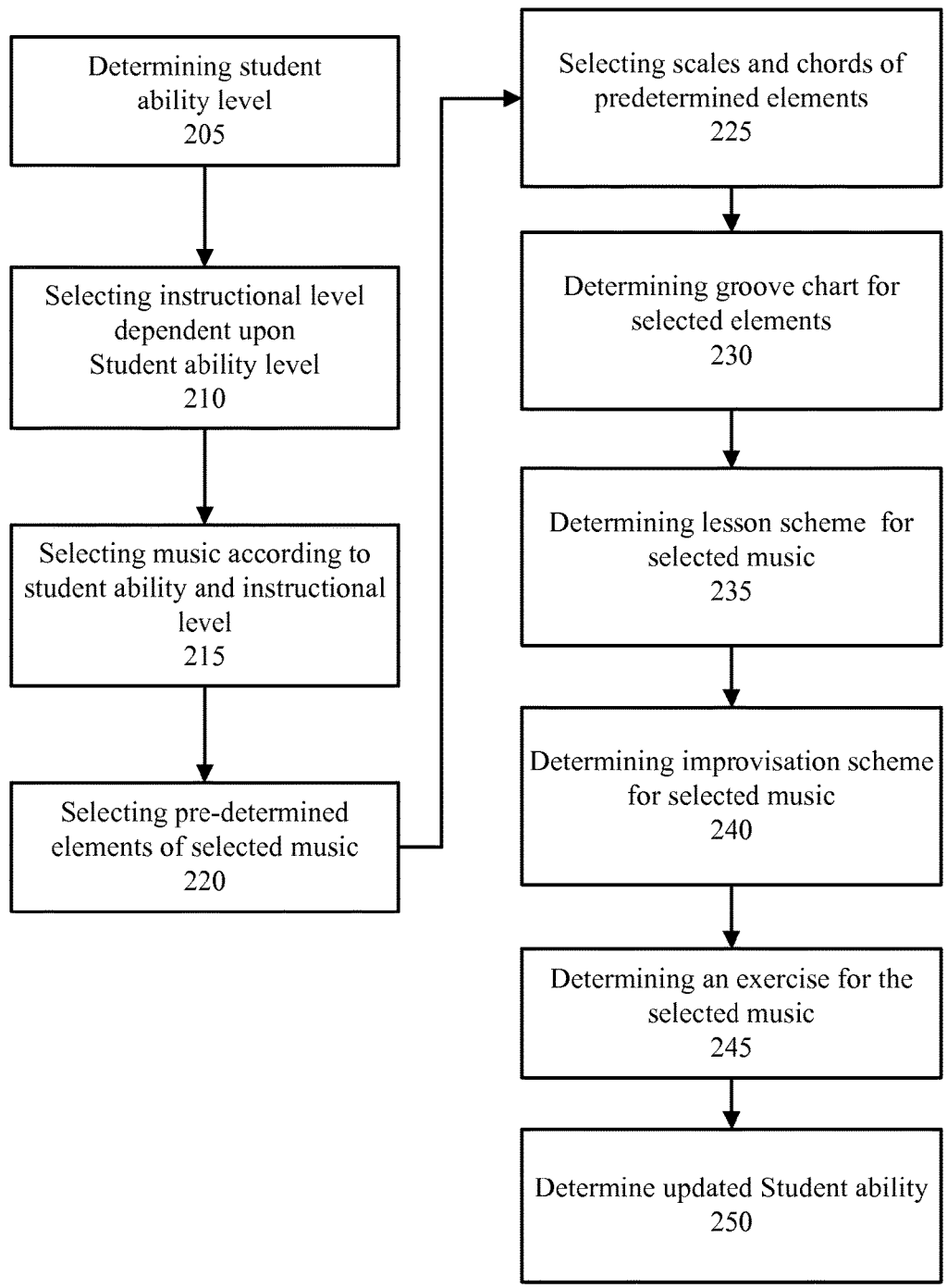
FIG. 2 is a an exemplary flow diagram according to one embodiment of the present invention.

Referring now to FIG. 2 there is shown an embodiment of the method according to the present invention. In a preferred embodiment the ability level of the student is determined (box 205) before selecting an instructional level (box 210). Music is selected based upon the student's musical preference, ability and the selected instructional level (box 215). It should be noted that a crucial part of the invention is the selection of the instructional level. This element dictates the outcome of the process and eventually the success of the student moving from one level to another.

Selecting pre-determined elements of the selected music (box 220) is of equal importance. The selections made in box 220 typically are tied to the method of learning that best suites the student. Likewise, selecting scales and chords of the pre-determined elements box 225) is also related to the method of learning preferably to the student.

In Box 230 the system determines a groove chart for the selected elements and then determines a lesson scheme for the selected music in box 235. Determining an improvisation scheme for the selected music for the student occurs in box 240. Determining an exercise for the selected music upon the ability level of the student and the selected instructional level occurs in box 245. These steps in turn allow an update to the student's ability level in box 250.

Figure 3:
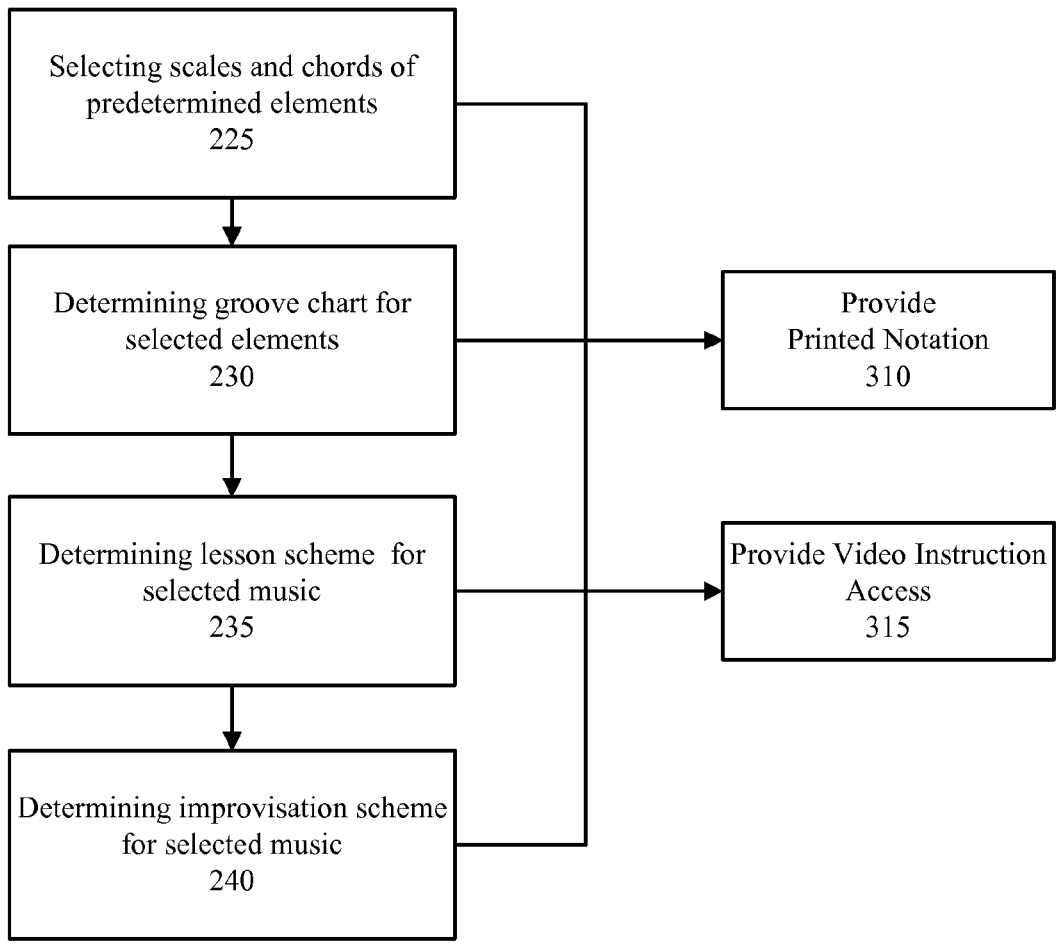
FIG. 3 is another exemplary flow diagram according to one embodiment of the present invention.

Referring now to FIG. 3 there is shown another embodiment of the present invention where through the various steps detailed in FIG. 2 the student can be presented with the selected elements in printed notation (box 310) and/or video instructional access tools (box 315). The video instruction can be live or recorded. It is important to note that steps 225, 230, 235, 240 represented in FIG. 3 are the scales and chords, groove charts, song lessons, and exercises, respectively, and each of these steps can be accessed via printed instruction and/or video instruction.

Figure 4:
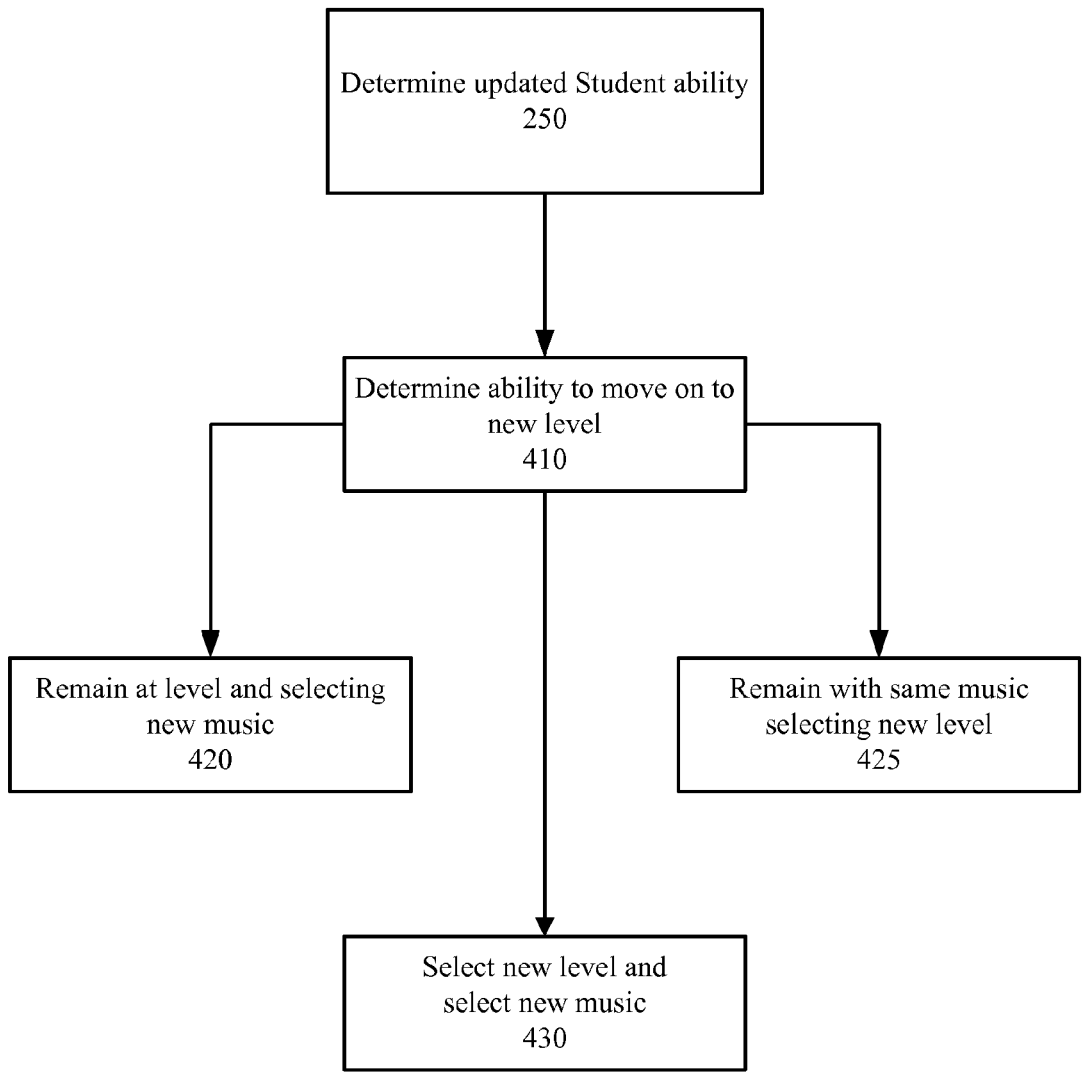
FIG. 4 is another exemplary flow diagram according to one embodiment of the present invention.

Referring now to FIG. 4 there is shown a process of how a student continues to increase the ability level (box 410), maintain the pre-selected music and go the next level of instruction (box 425) or remain at the same level and select new music to learn (box 420) in the process as described in FIG. 1. Once the instruction is completed the student can select new music and/or a new level to continue training and instruction.

Figure 5A:
FIGS. 5A-5B show musical lines from exemplary Song Lessons for the piano from a popular rock song "You Can't Always Get What You Want" written by Keith Richards and Mick Jagger of the rock band 'The Rolling Stones'.
Figure 5A:
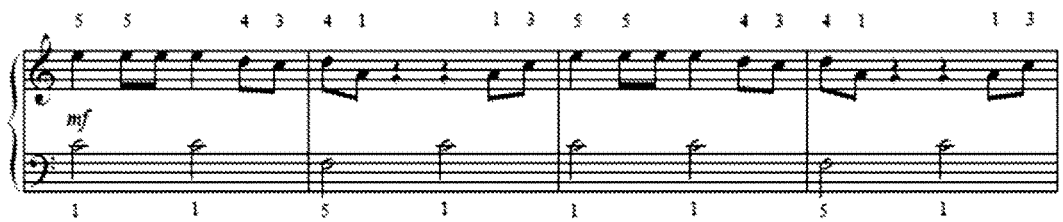
Figure 5A:
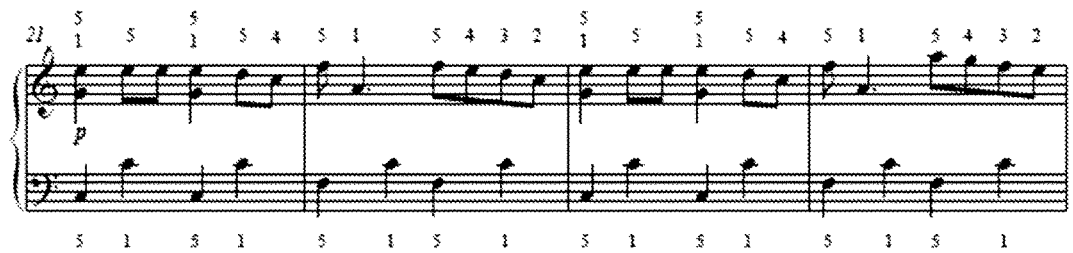
Figure 5A:
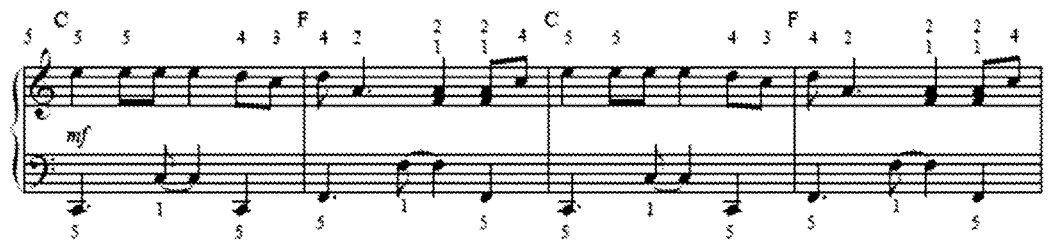
Figure 5B:
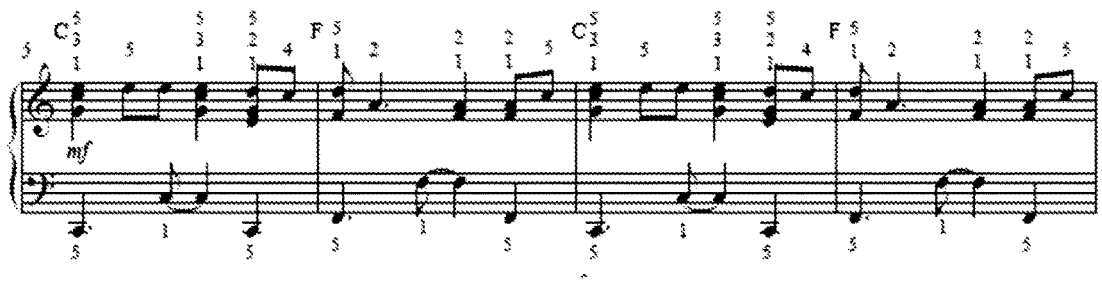
Figure 5B:
Figure 5B:
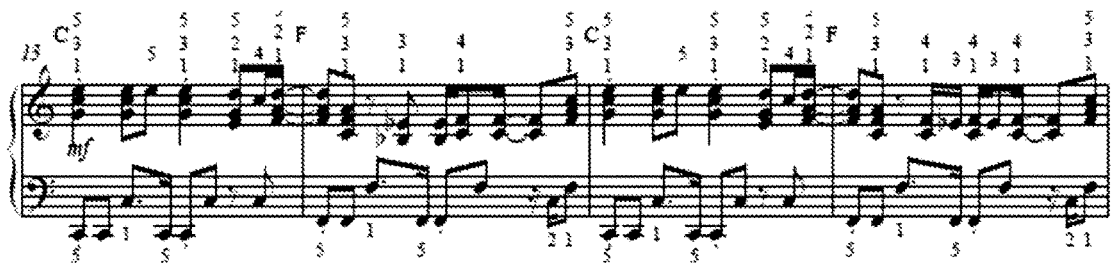

FIGS. 5A-5B show seven musical lines from exemplary Song Lessons for the piano from a popular rock song "You Can't Always Get What You Want" written by Keith Richards and Mick Jagger of the rock band 'The Rolling Stones'.

The first represents a line from a Level 1 Song Lesson for the piano, the second represents a line from a Level 2 Song Lesson for the piano, and the subsequent musical lines represent Song Lessons for the piano of increasing difficulty and musical complexity all for the same musical selection. FIGS. 5A-5B is exemplary of a method of providing piano instruction that provides enough discrete levels for each musical selection that students of all levels, beginners through advanced can learn the musical selection. All seven lines represent a similar melody line from the popular rock song "You Can't Always Get What You Want" written by Keith Richards and Mick Jagger of the rock band 'The Rolling Stones'; each with increasing musical complexity as per table 1. A person skilled in the art of music will see that the level 1 Song Lesson includes entry level knowledge of music with the use of whole notes in the left hand, single hand positions for each hand, and quarter notes and half notes in the right hand. The level 2 Song Lesson increases in musical complexity with the addition of quarter note syncopations, a more complex left hand half-note groove, and the addition of eighth notes in the melody line. The level 3 Song Lesson increases in musical complexity with the addition of eighth note syncopations in the right hand, a more complex left hand quarter-note groove, one-octave range, and the addition of two-note chords in the melody line. The level 4 Song Lesson increases in musical complexity with the addition of eighth-note syncopations in either hand, a more complex left hand eighth-note syncopated groove, and the continuation of two-note chords in the melody line. The level 5 Song Lesson increases in musical complexity with the continuation of eighth-note syncopations in either hand and the addition of three-note chords in the melody line. The level 6 Song Lesson increases in musical complexity with the addition of sixteenth-note syncopation in the right hand, a more complex left hand eighth-note syncopated groove, and the continuation of two and three-note chords in the melody line. The level 7 Song Lesson increases in musical complexity with the addition of sixteenth-note syncopation in either hand, a more complex left hand sixteenth-note syncopated groove, and the continuation of two and three-note chords in the melody line.

FIGS. 6A-6B shows seven musical lines from exemplary Exercises for the piano from a popular rock song "You Can't Always Get What You Want" written by Keith Richards and Mick Jagger of the rock band 'The Rolling Stones'.

The lines are exemplary of Exercises for the piano based on specific technical and theoretical fundamentals that are required to understand and perform the particular musical selection. The particular Exercise represented in FIGS. 6A-6B is intended to provide the student with the technical and theoretical fundamentals of the underlying chord structure of the musical selection, but Exercises can be designed to instruct the student on any musical fundamental such as; musical keys, accidentals, time signatures, scales, rhythms, rests, hand positions, sound dynamics, composition length, articulation, chord structures, intervals, groove, note durations, or syncopation. The first represents a line from a Level 1 Exercise for the piano, the second represents a line from a Level 2 Exercise for the piano, and the subsequent musical lines represent Exercises for the piano of increasing difficulty and musical complexity all for the same musical selection. FIGS. 6A and 6B are exemplary of a method of providing piano instruction that provides enough discrete levels for each musical selection that students of all levels, beginners through advanced can learn the musical selection. All seven lines represent a musical fundamental from the popular rock song "You Can't Always Get What You Want" written by Keith Richards and Mick Jagger of the rock band 'The Rolling Stones'; each with increasing musical complexity as per table 1. A person skilled in the art of music will see that the level 1 Exercise includes entry level knowledge of music with the use of whole notes in the left hand, single hand positions for each hand and quarter notes and half notes in the right hand. As per table 1, each level increases in musical with the level 7 Exercise increasing in musical complexity to a right hand pattern of dyads in the intervals of fifths and sixths and left hand arpeggiated chords moving in both forward and contrary motion.

Figure 7A:
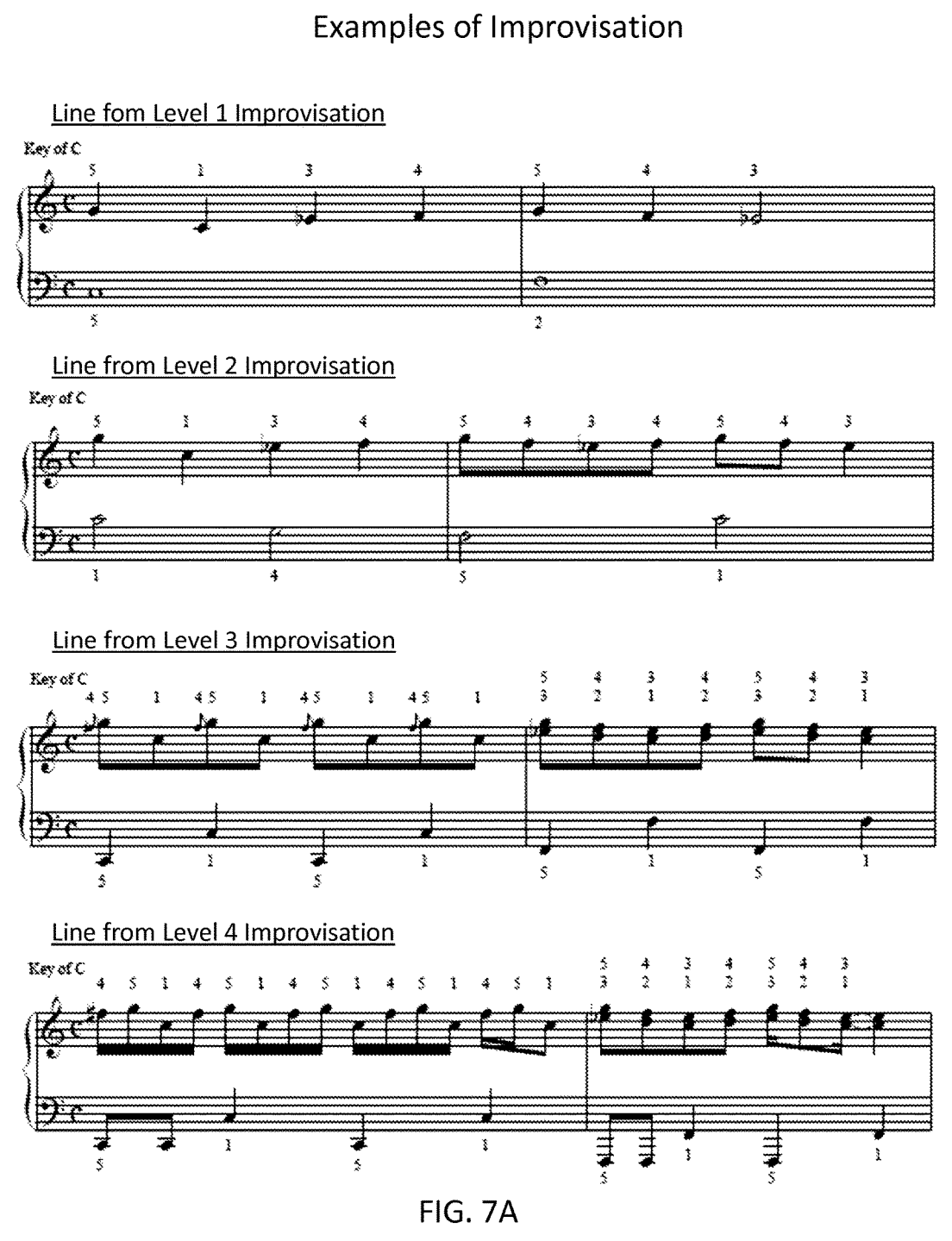

FIGS. 7A-7B shows seven musical lines from exemplary Improvisations for the piano from a popular rock song "You Can't Always Get What You Want" written by Keith Richards and Mick Jagger of the rock band 'The Rolling Stones'.

Figure 8:
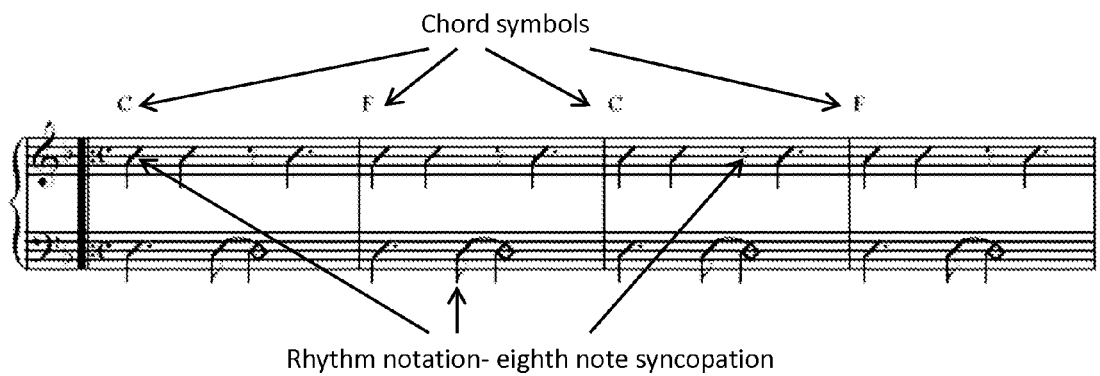
FIG. 8 shows lines from exemplary Groove Charts for the piano from a popular rock song "You Can't Always Get What You Want" written by Keith Richards and Mick Jagger of the rock band 'The Rolling Stones'.
Figure 8:
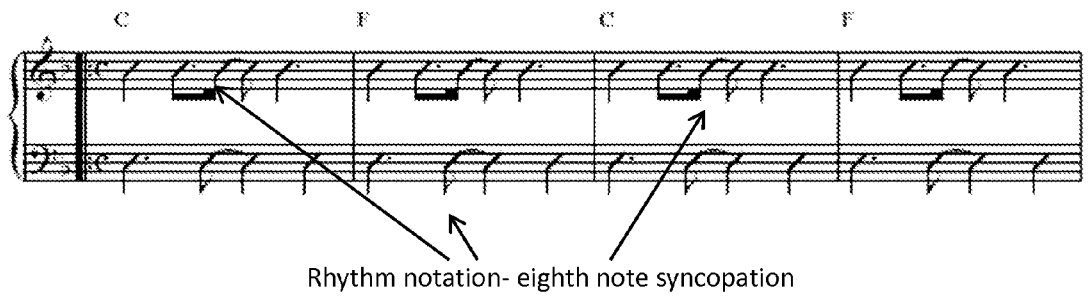

The lines are exemplary of Improvisations for the piano based on specific technical and theoretical fundamentals that are required to understand and perform the particular musical selection. The particular Improvisation represented in FIG. 8 is intended to provide the student with the technical and theoretical fundamentals of improvising using the blues scales and chromatic passing tones over a syncopated bass groove, but Improvisations can be designed to instruct the student on any musical fundamental such as; musical keys, accidentals, time signatures, scales, rhythms, rests, hand positions, sound dynamics, composition length, articulation, chord structures, intervals, groove, note durations, or syncopation. The first represents a line from a Level 1 Improvisation for the piano, the second represents a line from a Level 2 Improvisation for the piano, and the subsequent musical lines represent Improvisations for the piano of increasing difficulty and musical complexity all for the same musical selection.

FIGS. 7A and 7B are exemplary of a method of providing piano instruction that provides enough discrete levels for each musical selection that students of all levels, beginners through advanced can learn the musical selection. All seven lines represent a improvisational technique from the popular rock song "You Can't Always Get What You Want" written by Keith Richards and Mick Jagger of the rock band 'The Rolling Stones'; each with increasing musical complexity as per table 1. A person skilled in the art of music will see that the level 1 Improvisation includes entry level knowledge of music with the use of whole notes in the left hand, the first five notes of the relevant blues scale, single hand positions for each hand and quarter notes and half notes in the right hand. As per table 1, each level increases in musical with the level 7 Improvisation increasing in musical complexity to a right hand sixteenth-note musical 'riff', the relevant blues scales along with chromatic passing tones, and a left hand sixteenth-note syncopated groove.

FIG. 8 shows lines from exemplary Groove Charts for the piano from a popular rock song "You Can't Always Get What You Want" written by Kith Richards and Mick Jagger of the rock band 'The Rolling Stones'.

FIG. 8 shows two musical lines where the lines are exemplary of Groove Charts for the piano based on specific rhythms, chords, and chord progressions that are required to understand and perform the particular musical selection. The Groove Charts include the chord symbols and rhythm notation but the actual notes on the musical staff are left unspecified so the student can choose any notes within the specified chord. The particular Groove Charts represented in FIG. 8 are intended to provide the student with the technical and theoretical fundamentals of accompanying a band with a particular eighth note and sixteenth not rhythm (i.e. groove) but Groove Charts can be designed to instruct the student on any musical fundamental such as; musical keys, accidentals, time signatures, scales, rhythms, rests, hand positions, sound dynamics, composition length, articulation, chord structures, intervals, groove, note durations, or syncopation. The first represents a line from a Level 4 Groove Chart for the piano and the second represents a line from a Level 6 Groove Chart for the piano. The two musical lines represent Groove Charts for the piano of increasing difficulty and musical complexity for the same musical selection. FIG. 8 is exemplary of a method of providing piano instruction that provides enough discrete levels for each musical selection that students of all levels, beginners through advanced can learn the musical selection. Both lines represent a chord progression and rhythm from the popular rock song "You Can't Always Get What You Want" written by Keith Richards and Mick Jagger of the rock band 'The Rolling Stones'; with increasing musical complexity as per table 1. A person skilled in the art of music will see that the level 4 Groove Chart includes a suggested rhythm for the song based on eighth note syncopations while the Level 6 Groove Chart includes a suggested rhythm for the song based on sixteenth note syncopations which requires a higher level of skill and musical knowledge to master.

It will be apparent to one skilled in the art that described herein is a novel apparatus, system and method for musical instruction. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

TABLE 1

| Level | Difficulty | Major Keys | Accidentals | Time | Tonality | Rhythm | Rest | Hand Positions and Reach | Dynamics |
|---|---|---|---|---|---|---|---|---|---|
| 0 | Beginner-note learner | C, G | 1 | 2/4, 4/4 | Major | Whole, half, quarter | Whole | Five notes, no crossovers, one hand position | None |
| 1 | Very Easy | C, G, F | 1 | 2/4, 3/4, 4/4 | Major & Minor | Whole, half, quarter notes | Whole, Half, quarter | Five notes, no crossovers, one hand position | None |
| 2 | Easy | C, G, F, B♭,, D | 2 | 2/4, 3/4, 4/4 | Major & Minor | Whole, half, quarter notes, eighths | Whole, Half, quarter, eighth | Five notes, simple crossover allowed (hand position moves with crossover) | p, f, mf |
| 3 | Moderately Easy | C, G, F, B♭, D, E♭ | 3 | 2/4, 3/4, 4/4, 6/8 | Major & Minor, Mixolydian, Blues | Whole, half, quarter notes, eighths, dotted, straight/swing, cut time, 16th groupings, 16th flags on dotted eighths | Whole, half quarter, eigth, sixteenth | Octave, crossovers allowed (hand position moves with crossover) | p, f, mf, pp, p, mf, f, ff |
| 4 | Moderately Difficult | C, G, F, B♭, D, E♭, A | 3 | 2/4, 3/4, 4/4, 6/8, 3/8, 9/8 | Major & Minor, Mixolydian, Blues Dorian, Lydian | Whole, half, quarter notes, eighths, dotted, straight/swing, cut time, 16th groupings, 16th flags on dotted eighths, 12/8, 4/2, 16th runs | | Octave, Crossovers, multiple hand positions | pp thru ff plus fp, cresc. and decresc. |
| 5 | Difficult | C, G, F, B♭, D, E♭, A, E, Ab | 4 | 2/4, 3/4, 4/4, 6/8, 3/8, 9/8, 5/4, 7/4 | Major & Minor, Mixolydian, Blues Dorian, Lydian | Whole, half, quarter notes, straight/swing, cut time, 16th groupings, 16th flags on dotted eighths, 12/8, 4/2, 16th runs, grace notes, 32nds, triplet | | Octave, Crossovers, multiple hand positions | ppp thru fff plus sfz, fz, rf |
| 6 | Very | C, G, F, | 5 | 2/4, 3/4, | Major & | All plus | | Tenth, | All |

TABLE 1-continued

|   | Difficult | Bb, D, Eb, A, E, Ab, B, Db, G# | | 4/4, 6/8, 3/8, 9/8, 5/4, 7/4, 3/2 | Minor, Mixolydian, Blues Dorian, Lydian, Altered | aleatoric | | Crossovers, multiple hand positions | |
| --- | --- | --- | --- | --- | --- | --- | --- | --- | --- |
| 7 | Virtuostic | All, mixed | 5 | All, with time changes | All, atonal, quater-tonal, altered | All plus aleatoric | | Tenth, Crossovers, multiple hand positions | All |

| Level | Length | Articulation | SCALES | Comments | Intervals | Groove | Triplets | Syncopations | Cross Rhythms |
| --- | --- | --- | --- | --- | --- | --- | --- | --- | --- |
| 0 | Very short | None | C, G | Each hand seperate, 5 finger patterns | None | None | None | None | None |
| 1 | Very short | Legato | C, F, G; hands seperate or together | Hands together, but one hand easier, simple melody in one hand | No Chords | one hand whole note throughout the piece; other hand quarter, half, whole notes | None | Half note syncopation | None |
| 2 | Short | Legato, phrase marks, slurs, staccato | C, G, F, Bb, D, one octave, quarter note = 72, eighth notes, hands together | Hands together, no contrary motion | Whole, half note Chords- two notes, one hand only; 2nds, 3rds, 4ths, 5ths | one hand whole or half note throughout th piece; other hand eighth, quarter, half, whole notes. | None | quarter note syncopation | None |
| 3 | Short to medium | Legato, phrase marks, slurs, staccato | C, G, F, Bb, D, Eb two octaves, quarter note = 72, hands together | Passing tones, ties accidentals, simple contrary motion | Chords-three notes, one hand, 2nds, 3rds, 4ths, 5ths, 6ths, largest reach is a 6th. | Whole, half or quarter note groove (can use eight notes if other hand is very easy); other hand eighth, quarter, half, whole notes. Groove can move from left to right hand each measure | Quarter note triplets over a half | 8th note syncopation in one hand only, or both hands if in sync; only one 8th note sync per measure | None |
| 4 | Medium, | Legato, phrase marks, slurs, staccato | C, G, F, Bb, D Eb, A two octaves, quarter note = 72, triplet eighth notes, hands together | Ritards | 2nds, 3rds, 4ths, 5ths, 6ths, chords- both hands, including, octaves, dom 7, arpeggio; Chords-3note with octave reach | Whole, half or quarter, eighth note groove; other hand sixteenth, eighth quarter, half, whole notes. Groove can move from left to right hand each measure | Quarter note triplets over 2 quarters. 8th note triplets over a quarter. | 8th note syncopation in either hand, but not in same measure; or both hands if in sync; 16th note syncopation in one hand only, or both hands if in sync; only one 16th note sync per measure | None |
| 5 | Long, plus multi movement | Legato, phrase marks, slurs, staccato, phrasing | C, G, F, Bb, D, Eb, A, E, Ab, B, two octaves, quarter note = 72, triplet eighth notes, hands together | Level 5 should be close to original song or slightly simpler | 2nds, 3rds, 4ths, 5ths, 6ths, chords- both hands, including, octaves, dom 7, arpeggio; chords 4 note with octave reach | Level 5 groove should be close to original song or slightly simpler | 8th triplets over two 8ths; | 8th note syncopation in both hands 16th note syncopations in one hand only, or both hands if in sync | Three 8th note pattern, over four, resets each measure |
| 6 | Any | Any | 15 scales, four octaves, quarter note = 92-112 hands together | Level 6 should be close to original song | All chords, both hands, parallel 6th one hand' chords-5 note with octave reach; intervals- broken tenths | Level 6 groove should be close to original song | 16th triplets over one eighth | 16th note syncopation in either hand, but not in same measure; or both hands if in sync | Three 8th note pattern, over four extends beyond one measure or three 16th note |

TABLE 1-continued

| 7 | Any | Any | 15 scales, four octaves, quarter notes = 92-112, hands together | Can be more complex than original | All chords, both hands, parallel 6ths both hands; chords-5 notes with tenth reach. | Groove can be more complex than original | All | All | pattern, over four, resets each measures. Three 16th note pattern, over four, extends beyond one measure |

What is claimed is:

1. A method for teaching music instruction, the method comprising the steps of:
    determining an ability level of a student;
    selecting an instructional level of a piece of music selected by the student based upon the
    determined ability level of the student;
    identifying a first set of pre-determined musical elements based on the determined ability level of the student and the selected instructional level, where the first set of pre-determined musical elements includes selecting a groove chart for the piece of music selected by the student; wherein said groove chart consists of rhythm and chord progressions without the need for note locations on a staff; and
    providing at least one set of levels for the piece of music selected by the student to allow the student to progress from at least a first level to at least one advanced level.

2. The method for teaching instruction according to claim 1 further comprising the step of determining an updated student ability level after the step of selecting at least one element from the first set of pre-determined musical elements.

3. The method for teaching instruction according to claim 1 further comprising the step of providing print information.

4. The method for teaching instruction according to claim 1 further comprising the step of providing video instruction access.

5. The method for teaching instruction according to claim 1 further comprising the step of providing in-person instruction.

6. The method for teaching instruction according to claim 2 further comprising the step of selecting new music for the student after the step of determining an updated student ability.

7. The method for teaching instruction according to claim 2 further comprising the step of increasing the instructional level for the student after the step of determining an updated student ability.

8. The method for teaching instruction according to claim 1 where the step of selecting music further comprises the step of selecting music based upon a student's pre-determined choices.

9. The method for teaching instruction according to claim 1 further comprising the step of providing at least one set of levels for the selected music in order to allow the student to learn the musical selection regardless of the student's determined ability.

10. The method for teaching instruction according to claim 1 where the first set of pre-determined musical further elements comprises the step of selecting scales and chords.

11. The method for teaching instruction according to claim 1 further comprising the step of determining an exercise for the selected music based upon the ability level of the student and the selected instructional level.

12. The method for teaching instruction according to claim 1 where the first set of pre-determined musical elements further comprises the step of determining a lesson scheme for the selected music based upon the ability level of the student and the selected instructional level.

13. The method for teaching instruction according to claim 1 where the first set of pre-determined musical elements further comprises the step of determining an improvisation for the selected music based upon the ability level of the student and the selected instructional level.

14. A method for teaching, the method comprising the steps of:
    determining an ability of level of a student for a pre-determined skill;
    selecting an instructional level based upon the determined ability level of the student;
    selecting an educational representation of the pre-determined skill based on the determined ability level of the student, pre-selected choices of the student and the selected instructional level;
    determining a groove chart for the selected pre-determined skill based upon the ability level of the student and the selected instructional level, wherein said groove chart consists of rhythm and chord progressions without the need for note locations on a staff;
    identifying a first set of pre-determined elements of the selected educational representation of the pre-determined skill to be taught to the student;
    selecting at least one element from the first set of pre-determined elements of the educational representation of the pre-determined skill;
    identifying at least one pattern of the educational representation for the selected at least one pre-determined element based upon the ability level of the student and the selected instructional level;
    determining a lesson scheme for the at least one pre-determined element based upon the ability level of the student and the selected instructional level;
    determining a creative expression for the selected educational representation of the pre-determined skill based upon the ability level of the student and the selected instructional level;
    determining an exercise for the selected educational representation of the pre-determined skill based upon the ability level of the student and the selected instructional level, and providing at least one level for each educational representation of the pre-determined skill selection to allow the student to progress from a beginner level to an advanced level.

\* \* \* \* \*

UNITED STATES PATENT AND TRADEMARK OFFICE
CERTIFICATE OF CORRECTION

PATENT NO. : 9,721,479 B2
APPLICATION NO. : 13/905464
DATED : August 1, 2017
INVENTOR(S) : Howard Citron et al.

Page 1 of 1

It is certified that error appears in the above-identified patent and that said Letters Patent is hereby corrected as shown below:

In the Specification

At Column 1, Line 55, please change "internet" to -- Internet --.
At Column 1, Line 56, please change "a an" to -- an --.
At Column 2, Line 1, please change "In first" to -- In the first --.
At Column 2, Line 32, please change "further elements" to -- elements further --.
At Column 2, Line 50, please change "computer readable" to -- computer-readable --.
At Column 6, Line 9, please change "computer 20" to -- computer 110 --.
At Column 6, Line 25, please change "interface 190" to -- interface 195 --.
At Column 6, Line 55, please change "is can" to -- can --.
At Column 7, Line 63, please change "charts" to -- Charts --.
At Column 8, Line 66, please change "internet" to -- Internet --.
At Column 12, Line 15, please change "musical with" to -- musical complexity with --.
At Column 12, Line 27, please change "FIG. 8" to -- FIG. 7 --.
At Column 12, Line 54, please change "musical with" to -- musical complexity with --.
At Column 13 and 14, in Table 1, under heading Rest, Line 12, please change "eigth," to -- eighth, --.
At Column 13 and 14, in Table 1, under heading Tonality, Line 25, please change "quater-tonal," to -- quarter-tonal, --.
At Column 13 and 14, in Table 1, under heading Scales, Line 4, please change "seperate" to -- separate --.
At Column 13 and 14, in Table 1, under heading Comments, Line 2, please change "seperate" to -- separate --.
At Column 13 and 14, in Table 1, under heading Groove, Line 12, please change "th" to -- the --.

In the Claims

At Column 17, Lines 66 & 67 (Claim 10, Line 2 & 3), please change "musical further elements" to -- musical elements further --.

Signed and Sealed this
Seventh Day of August, 2018

Andrei Iancu
*Director of the United States Patent and Trademark Office*